Patented Sept. 11, 1928.

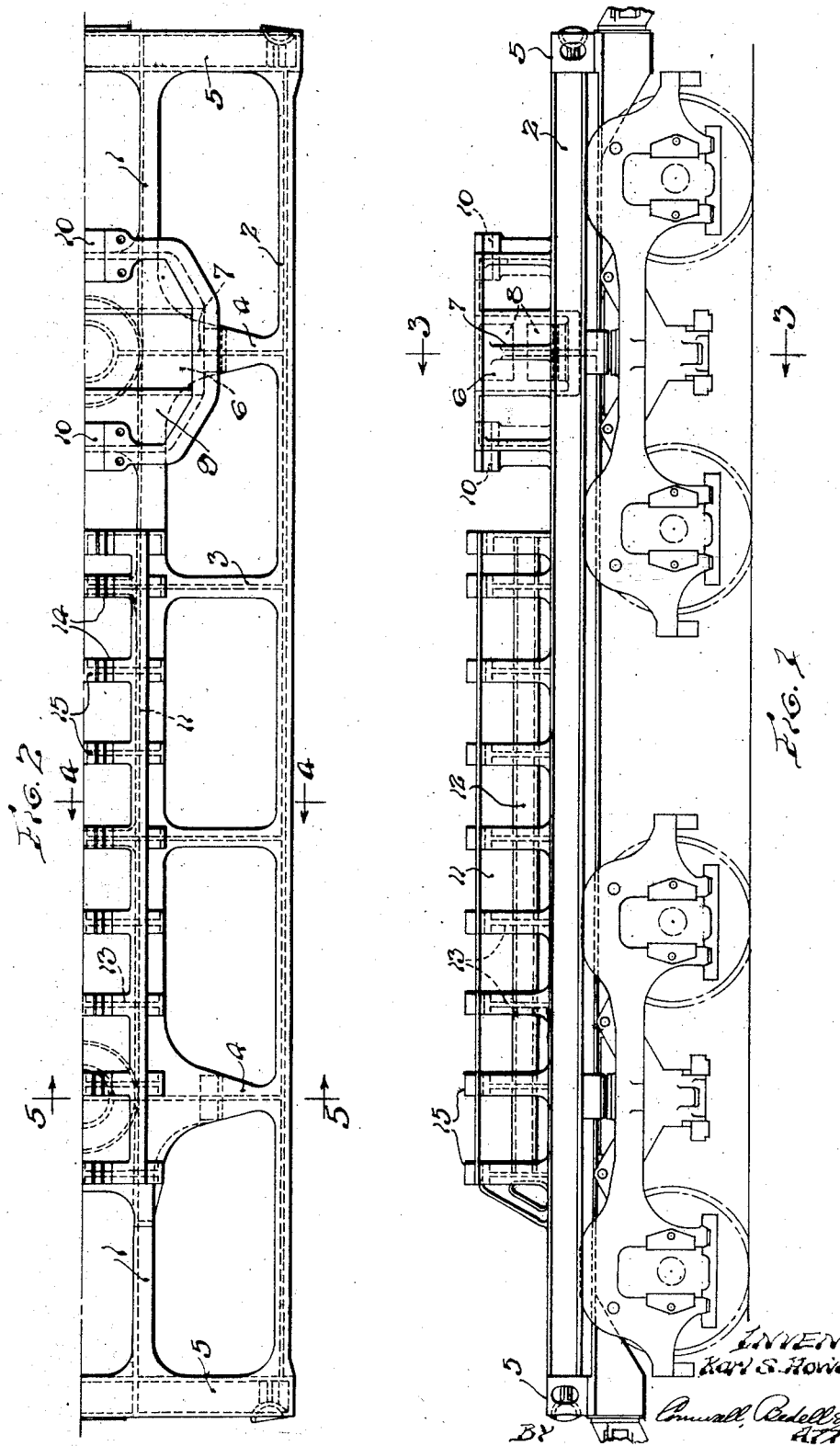

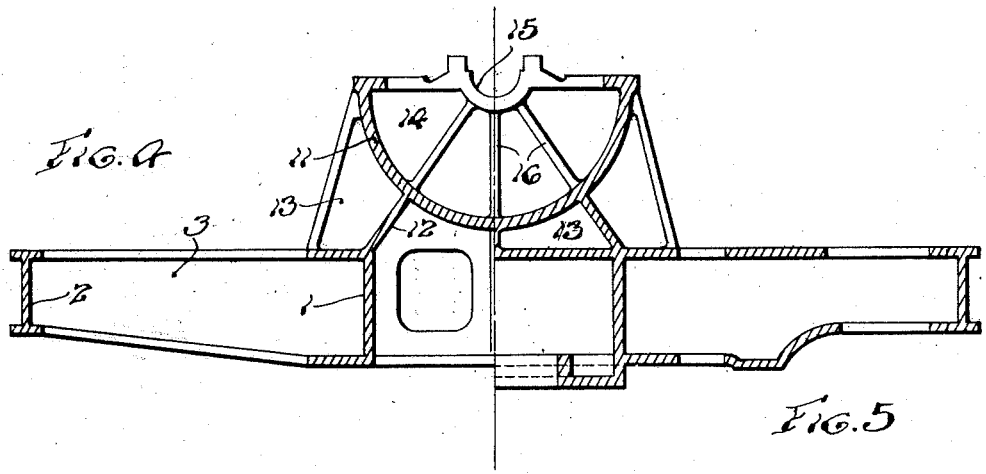
Fig. 4
Fig. 5
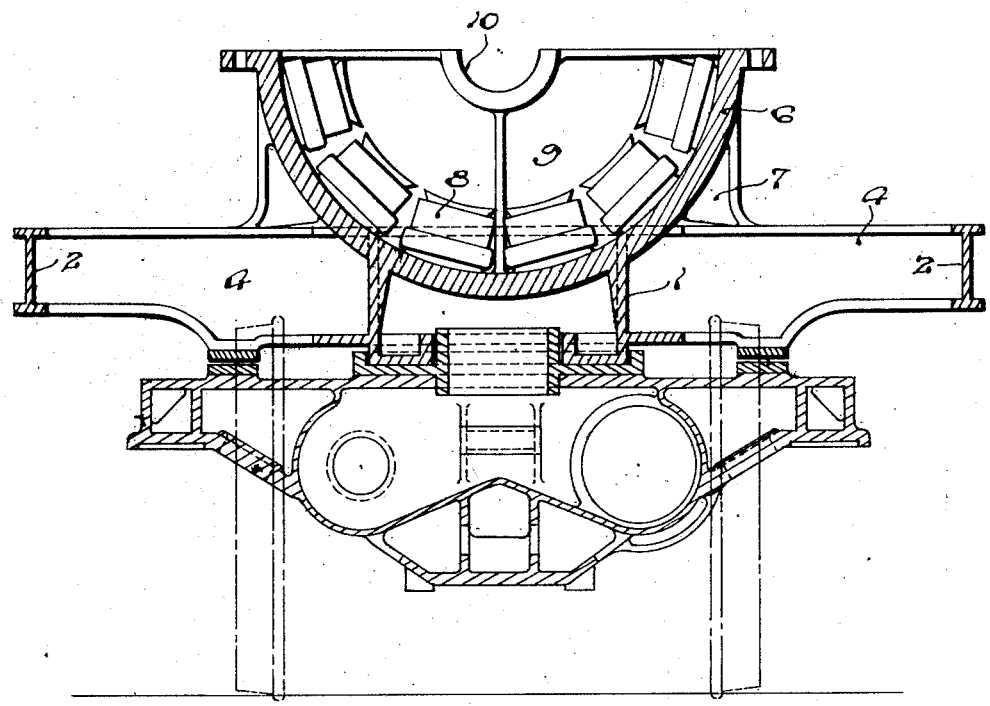
Fig. 3

1,683,672

UNITED STATES PATENT OFFICE.

KARL S. HOWARD, OF ST. LOUIS, MISSOURI, ASSIGNOR TO COMMONWEALTH STEEL COMPANY, OF GRANITE CITY, ILLINOIS, A CORPORATION OF NEW JERSEY.

LOCOMOTIVE STRUCTURE.

Application filed August 18, 1926. Serial No. 129,933.

My invention relates to railway rolling stock and consists in an improved electric locomotive structure.

The main object of my invention is to produce a cab underframe for an electric locomotive from a single casting which will include portions of the power plant which drives the locomotive.

In the accompanying drawings which illustrate a selected embodiment of my invention—

Figure 1 is a side elevation of my improved cab underframe mounted upon two four-wheel trucks.

Figure 2 is a one-half longitudinal top view of the cab underframe.

Figure 3 is a vertical transverse section taken on line 3—3 of Figure 1.

Figure 4 is a similar section taken on line 4—4 of Figure 2.

Figure 5 is a similar section taken on line 5—5 of Figure 2.

The trucks shown in the drawings form no part of my present invention and may be of any desired type such as are described and illustrated in the copending applications of William M. Sheehan, Patent Numbers 1,634,307, and 1,634,308, issued July 5, 1927. The cab underframe is preferably formed from a single casting and includes longitudinal center sills 1, preferably channel shaped in cross section, side sills 2 preferably I-shaped in cross section, transoms 3 and bolsters 4 also I-shaped in cross section, and end sills 5 of box-shaped cross section. At the right hand bolster of the underframe the sills 1 and the bolster 4 are modified and enlarged to form the lower portion 6 of the frame of the locomotive generator, the same extending upwardly and outwardly of the sills 1 and being reinforced by webs 7 which extend downwardly and outwardly from those portions of the generator frame which project above the main members of the cab underframe. Preferably, the generator frame 6 is provided with integrally formed pole pieces 8 although a suitable recessed element may be substituted for the pole pieces and adapted to receive windings if an alternating current generator be used.

The generator frame includes transverse elements 9 which support the integral bearing 10 for the generator shaft.

The cab underframe also includes the crank case 11 of an internal combustion engine which drives the generator and is formed integrally with the cab underframe, being supported above the level of the main members of the frame by integral webs 12 which extend upwardly from the tops of sills 1 and are reinforced at intervals by transverse elements 13. The engine crank case also includes integral portions 14 which mount the integral bearings 15 for the engine crank shaft. Portions 14 are reinforced by suitable ribs 16.

The upper edges of the generator frame 6 and of the engine crank case 11 are flanged to mount the upper portion of the generator frame and the cylinder block, respectively. These latter-mentioned parts are removable and form no part of my present invention and are not illustrated.

In the above described construction the underframe is materially strengthened by the integral forming of the generator frame and the engine crank case and other parts and obviously the power plant equipment is more rigid and may be made lighter because of its being constructed integrally with the underframe than would be the case if the underframe and generator and engine parts were made separately and assembled with each other.

Furthermore, the integral construction eliminates the expense of connecting elements and assembling labor which would be required if the parts were made separately and then fastened together.

In my copending applications filed of even date herewith Serial Numbers 129,932, 129,934 and 129,935, I illustrate and describe electric locomotive frames including pedestals and adapted to be mounted directly upon the journals of the wheel axles and the claims in this application directed to a cab underframe which is mounted upon a separate truck structure previously referred to are not intended to cover the same structure as is covered in the claims of my above mentioned applications. I contemplate the exclusive use of all such modifications of my present invention as are included in the scope of my claims.

I claim:

1. In a cab underframe for an electric locomotive, longitudinal sills and generator frame elements connecting said sills and formed integrally therewith.

2. A cab underframe for an electric locomotive comprising a one piece casting forming longitudinal sills, and transverse members between the same forming a portion of a generator frame.

3. A one piece casting comprising a cab underframe for an electric locomotive and having a generator frame formed integrally therewith.

4. A one piece casting comprising a cab underframe for an electric locomotive and having a generator frame and rotor bearings formed integrally therewith.

5. In a cab underframe for an electric locomotive, longitudinal sills, and an internal combustion engine crank case formed integrally with said sills.

6. A one piece casting forming a cab underframe for an electric locomotive and including the lower portion of the crank case of an internal combustion engine.

7. A one piece casting forming a cab underframe for an electric locomotive and including the lower portion of the crank case, and crank shaft bearings for an internal combustion engine.

8. In a cab underframe for electric locomotives, longitudinal spaced sills, integrally formed bearings for the crank shaft of an internal combustion engine, and integrally formed bearings for the rotor shaft of an electric generator.

9. In a one piece cast cab underframe for electric locomotives, integral crank shaft bearings for an internal combustion engine, and integral rotor shaft bearings for an electric generator.

10. In a one piece cast cab underframe for electric locomotives, an internal combustion engine crank case and crank shaft bearings, a generator frame, and generator bearings all formed integrally.

11. A one piece casting comprising a cab underframe for an electric locomotive and including spaced sills with an integrally formed crank case for an internal combustion engine, and an integrally formed generator frame between said sills.

12. A one piece casting comprising a cab underframe for an electric locomotive and including spaced sills with an integrally formed crank case for an internal combustion engine, and an integrally formed generator frame between said sills, said crank case and generator frame being provided with integral bearings for a crank shaft and a rotor shaft respectively.

13. An electric locomotive cab underframe casting forming portions of a generator frame having integral pole pieces thereon.

14. A one piece cast underframe for an electric locomotive comprising longitudinal sills, transverse members, a generator frame between said sills and extending outwardly and upwardly therefrom, and reinforcing brackets extending from the upper portions of said frame to said transverse members outside of said sills.

15. A one piece cast underframe for an electric locomotive comprising longitudinal sills, transverse members, a generator frame, an internal combustion engine crank case between said sills and extending outwardly and upwardly therefrom and reinforcing brackets extending from the upper portions of said crank case to said transverse members outside of said sills.

16. In a cab underframe for an electric locomotive, longitudinal sills, a bolster, and a generator frame formed integrally with said sills and bolster.

17. In a cab underframe for an electric locomotive, longitudinal sills, a bolster, and a generator frame formed integrally with said sills and bolster, said frame forming diagonal connections between said sills and bolster.

18. A cab underframe casting for an electric locomotive comprising a frame sill member and a generator frame element formed integrally with each other.

19. A cab underframe casting for an electric locomotive having an electric generator frame member formed integrally therewith and provided with elements for mounting a removable generator frame member.

20. A cab underframe casting for an electric locomotive having an internal combustion engine crank case formed integrally therewith and provided with elements for mounting a removable cylinder block.

21. A one-piece casting forming a cab underframe for an electric locomotive and including a portion of the crank case of an internal combustion engine.

22. A one-piece casting forming a cab underframe for an electric locomotive and including crank shaft bearings and a portion of the crank case of an internal combustion engine.

In testimony whereof I hereunto affix my signature this 13th day of August, 1926.

KARL S. HOWARD.